March 28, 1961     C. F. WARNOCK     2,977,405

ADJUSTABLE ELECTRICALLY INSULATING PIPE SPACER

Filed July 23, 1959

INVENTOR.
CHARLES F. WARNOCK
BY
ATTORNEY

United States Patent Office 2,977,405
Patented Mar. 28, 1961

2,977,405

ADJUSTABLE ELECTRICALLY INSULATING PIPE SPACER

Charles F. Warnock, Maracaibo, Venezuela, assignor to Gulf Oil Corporation, Pittsburgh, Pa., a corporation of Pennsylvania Filed July 23, 1959, Ser. No. 829,050

8 Claims. (Cl. 174—138)

This invention relates to a device for supporting pipe, particularly oil field pipe, which device is adapted to support an upper pipe on a lower pipe while at the same time keeping the pipes electrically insulated from each other.

In the production of oil from wells in an oil field, it is customary to pipe the oil from the various wells to a central tank facility, whence further pipelines may carry the oil to more distant metering facilities or tankage. It is also customary to run separate lines from the wells for carrying gas and oil. In the event that the oil field is divided into a number of leases under different ownership it is apparent that each owner will run separate pipelines. This results in a maze of crisscrossing pipe lines in the oil field and neighboring territory.

It is customary to alleviate corrosion in pipelines by the application of electric currents to various sections of the line or lines in so-called cathodic protection systems. The electric current is supplied by a network of electric generators, either wind or motor driven, or produced by the use of buried anodes usually of magnesium. It is apparent that each lease owner will be interested in protecting his own pipelines from corrosion, and it is further apparent that no lease owner will wish to have electric currents flowing in his neighbor's pipelines interfere with his own protective measures even though the lines may be in close proximity or actually cross each other. Accordingly it is highly desirable to electrically insulate pipelines where they cross each other in order that the electric current in one pipeline may not interfere with the electric current in the other pipeline. On the other hand, it is expensive and requires much duplication of equipment to provide separate mechanical supports for crisscrossing pipelines.

It is the purpose of this invention to provide a support which may be placed between two pipes crossing each other at any angle and which serves to support the upper pipe on the lower pipe while at the same time keeping the pipes electrically insulated.

The invention is described in a preferred embodiment with reference to the accompanying drawings in which Figures 1, 2, and 3 illustrate one embodiment of the invention employing no metal parts;

The invention in its simplest form comprises a saddle for supporting the upper pipe and an inverted saddle which rests on the lower pipe. The saddles are jointed by a pivotal connection so that the saddles may be rotated into any desired azimuthal relationship to each other. Means are provided for holding the two saddles together so that the assembly does not easily come apart.

Figure 1:
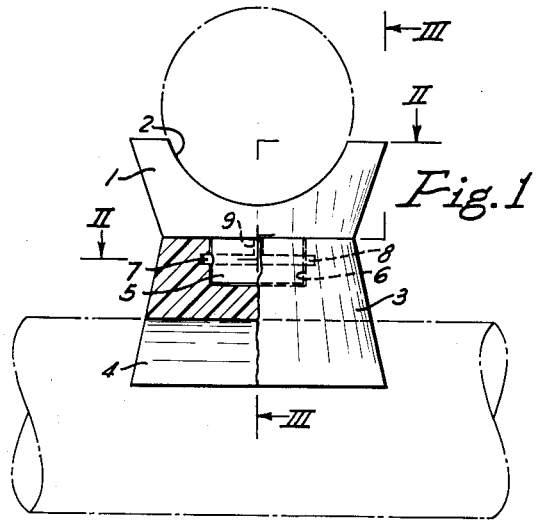
Figure 2:
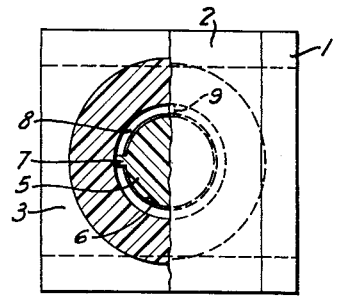
Figure 3:
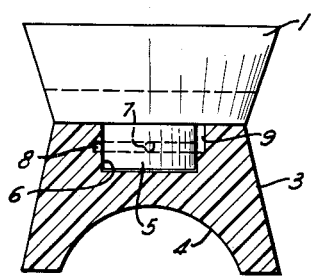

Figures 1, 2, and 3 illustrate one embodiment of the invention. Figure 2 is a section taken along the line II—II of Figure 1, and Figure 3 is a section taken along the line III—III of Figure 1. As shown in the figures an upper saddle member 1 is provided having an upper surface 2 that conforms to or is slightly larger in radius than the size of pipe which it is desired to support. An inverted lower saddle member 3 also has a cylindrical surface 4 which faces downward and rests on the lower pipe on which the upper pipe is to be supported. The upper saddle member 1 is provided with a downwardly extending boss 5 which fits into a socket 6 in the lower saddle member 3. By this means the upper and lower saddle members may be rotated about the center line of the boss 5. The assembly may thus be used as a supporting spacer between two pipelines which do not lie in the same plane and which cross each other at any angle. In order to keep the two saddle members 1 and 3 from separating, the boss 5 is provided with a side pin 7 which rides in an annular groove 8 cut in the cylindrical surface of the socket 6. The pin 7 may be made of round stock cemented or otherwise fastened into a drilled hole (not shown) in the boss 5. A slot 9 parallel to the axis of the socket 6 and best seen in Figure 3 is provided in order to permit the pin 7 to enter the annular groove 8. The two saddle members 1 and 3 are thus joined by means of the pin 5 and socket 6 forming a bayonet-type connection which comprises elements 5, 6, 7, 8, and 9.

At least one of, and preferably both of, the saddle members 1 and 3 are made of an electrically non-conducting material, preferably a synthetic plastic of any type that may be cast or molded in the customary manner of making devices of plastics. It is preferred to use a material that has substantial mechanical strength, high mechanical stability, and that is not thermo plastic. For example, materials such as Teflon or any of the phenolic or urea plastics may be employed. The device may be installed at the time the pipelines are installed or it may be installed at a later time when corrosion of the pipelines makes it evident that electrical isolation of the pipelines is advantageous.

Figure 4:
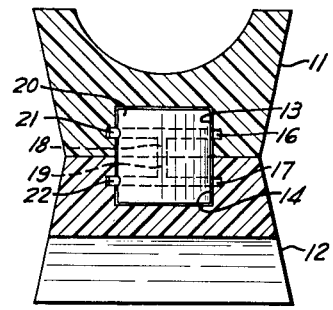
Figure 4 shows another embodiment of the invention employing a metal junction pin.

Referring now to Figure 4, there is shown an embodiment of the invention in which the upper saddle member 11 and the lower saddle member 12 are identical in that both members have in their base a recess indicated by 13 and 14 respectively, the recesses 13 and 14 being face to face and substantially identical. Each recess has an annular groove 16 and 17 respectively, and a vertical groove 18 and 19 respectively to provide access to the annular groove. The units are joined by a cylindrical pivot pin 20 which fits the recess in each saddle. The pin 20 has side pins 21 and 22 which respectively engage the annular grooves 16 and 17. The pins 21 and 22 may be made of round stock pressed, screwed, or otherwise fastened into a hole (not shown) in the pin 20. In this embodiment the pivot pin 20 makes a bayonet-type connection to each saddle member. In the embodiment of Figure 4 at least one and preferably both of the saddle members 11 and 12 is made of electrically nonconducting material, such as the plastic materials previously mentioned. The pivot pin 20 may also be made of plastic, but is preferably made of metal, preferably of a non-corrosive metal such as brass, stainless steel, or the like. The embodiment of Figure 4 is advantageous because saddle members 11 and 12 may be identical and therefore it is necessary to stock but one type of saddle member for each size of pipe to be accommodated, whereas the embodiment of Figure 1 requires stocking a male type and a female type in each pipe size.

Figure 5:
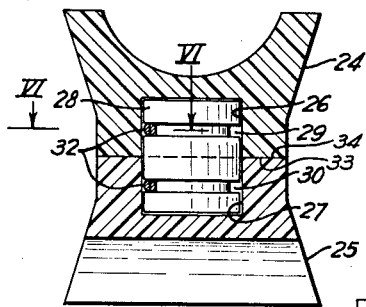
Figures 5 and 6 show another embodiment of the invention of Figure 4 in which a simple means is provided for locking the two saddle members of the device together.
Figure 6:
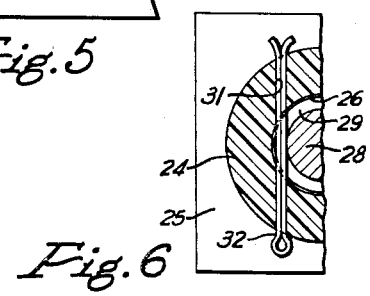

Figure 5 shows an embodiment of the invention that is similar to that of Figure 4 but employs a simpler and more positive type of locking arrangement. The saddle members 24 and 25 are each provided with substantially identical recesses 26 and 27 which are face to face. A cylindrical pivot pin 28 fits the recesses 26 and 27. The pivot pin 28 has near each end an annular groove 29 and 30. Each saddle member 24 and 25 is drilled transversely but off center with a hole 31 which engages the groove 29 or 30. The hole 31 is in such position off center that when a cotter pin 32 is inserted in the hole 31, it engages one of the annular grooves 29 or 30 of the pivot pin 28. The relationship of the hole 31, groove 29, and cotter pin 32 is best seen in Figure 6 which is a section taken along the line VI—VI of Figure 5. By inserting a cotter pin 32 in each of the saddle members 24 and 25 the two saddle members are held in engagement but may rotate relative to each other. In Figure 5 the saddle members are shown in contact at their respective base surfaces 33 and 34. If it is desired to space the saddle members farther apart this may easily be accomplished by employing an appropriately longer pivot pin 28 and placing spacer washers (not shown) between the base surfaces 33 and 34.

In the embodiment of Figure 5, at least one and preferably both the saddle members 24 and 25 are made of electrically nonconducting material such as the plastic materials previously mentioned. The pivot pin 28 may be made of plastic but is preferably made of a non-corrosive metal such as brass or stainless steel. The cotter pins 32 may be conventional being usually made of soft steel and it is preferred that they be protected from rusting as for example by cadmium plating. The embodiment of the invention shown in Figure 5 has the advantage of being simple to manufacture, and has the further advantage that once the units are assembled they do not come apart at any azimuth, whereas the bayonet-type of assembly permits the units to come apart at one azimuthal relation.

Figure 7:
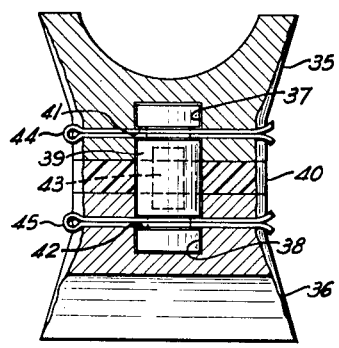
Figure 7 shows another embodiment of the invention employing metal pipe saddles and a nonconducting pin and washer.

In the embodiment of Figure 7 the saddles 35 and 36 and jointed in a manner mechanically similar to that employed in the embodiment of Figure 5. Figure 7 is a section partly off center to more clearly illustrate the cotter pins employed to engage the annular grooves in the pivot pin. The saddles 35 and 36 of Figure 7 are made of metal such as steel, and the base of each saddle member is drilled to form recesses 37 and 38 which are substantially identical and are placed face to face as indicated in Figure 7. In order to electrically insulate the metal saddle members 35 and 36 from each other the pivot pin 39 is made of electrically nonconducting material. By way of example the pivot pin 39 may be made of fabric-reinforced phenolic plastic rod such as canvas-base Bakelite or the like. The plastic pivot pin 39 has relatively high shear strength, but if desired its shear strength may be increased by molding into it a completely imbedded steel core 43 shown in dotted outline in Figure 7. An insulating washer 40 having a central hole which fits snugly on the pivot pin 39 is placed between the saddles 35 and 36 on assembly. The washer 40 is made of electrically nonconducting material. The insulating pivot pin 39 has an annular groove 41 and 42 near each of its ends. A transverse hole in each saddle member permits insertion of cotter pins 44 and 45 to engage the annular grooves 41 and 42 respectively in the pivot pin 39. The transverse holes into which the cotter pins are inserted are located off center in the same manner as illustrated in Figure 6. The embodiment of Figure 7 has the advantage of being less expensive to manufacture because it utilizes less plastic material.

Various embodiments of this invention serve to illustrate the invention and are not to be considered as limiting the scope thereof. Other modifications will occur to those skilled in the art.

What I claim as my invention is:

1. Apparatus for supporting an upper pipe on a lower pipe in electrically insulated relationship which comprises a saddle adapted to support the upper pipe, a saddle adapted to rest on the lower pipe, means pivotally engaging said saddles permitting relative rotation of said saddles, locking means on at least one of said saddles maintaining engagement thereof, and at least one of said saddles being made of electrically nonconducting material.

2. Apparatus for supporting an upper pipe on a lower pipe in electrically insulated relationship which comprises a saddle adapted to support the upper pipe, a saddle adapted to rest on the lower pipe, a recess in the base of each of said saddles, a pivot pin adapted to engage both of said recesses, locking means maintaining said pivot pin in engagement with said recesses, and at least one of said saddles being made of electrically nonconducting material.

3. Apparatus for supporting an upper pipe on a lower pipe in electrically insulated relationship which comprises a saddle adapted to support the upper pipe, a saddle adapted to rest on the lower pipe, a recess in the base of each of said saddles, a pivot pin adapted to engage both of said recesses, bayonet-type locking means maintaining said pivot pin in engagement with said recesses, and at least one of said saddles being made of electrically nonconducting material.

4. Apparatus for supporting an upper pipe on a lower pipe in electrically insulated relationship which comprises an upper saddle adapted to support the upper pipe, a lower saddle adapted to rest on the lower pipe, at least one of said saddles being made of electrically nonconducting material, a cylindrical protrusion on one of said saddles on the face opposite to that which contacts the pipe, a cylindrical recess in the face of the other saddle opposite to that which contacts the pipe, said protrusion fitting said recess, and bayonet-type locking means holding said protrusion in said recess and allowing relative rotation therebetween.

5. Apparatus for supporting an upper pipe on a lower pipe in electrically insulated relationship which comprises a saddle adapted to support the upper pipe, a saddle adapted to rest on the lower pipe, a recess in the base of each of said saddles, a pivot pin adapted to engage both of said recesses, a groove near each end of said pivot pin, a perforation in each of said saddles, said perforation being transverse to the axis of said recess and intersecting one of said grooves in said pivot pin, a cotter pin in each of said perforations respectively engaging said grooves, and at least one of said saddles being made of electrically nonconducting material.

6. Apparatus for supporting an upper pipe on a lower pipe in electrically insulated relationship which comprises a saddle adapted to support the upper pipe, a saddle adapted to rest on the lower pipe, a recess in the base of each of said saddles, a pivot pin adapted to engage both of said recesses, locking means maintaining said pivot pin in engagement with said recesses, a washer adapted to fit over said pivot pin, and at least one of said saddles being made of electrically nonconducting material.

7. Apparatus for supporting an upper pipe on a lower pipe in electrically insulated relationship which comprises a saddle adapted to support the upper pipe, a saddle adapted to rest on the lower pipe, a recess in the base of each of said saddles, a pivot pin of electrically insulating material adapted to engage both of said recesses, locking means maintaining said pivot pin in engagement with said recesses, and an electrically insulating washer adapted to fit over said pivot pin.

8. Apparatus for supporting an upper pipe on a lower pipe in electrically insulating relationship which comprises a saddle having a pipe-engaging surface and adapted to support the upper pipe, a saddle having a pipe-engaging surface and adapted to rest on the lower pipe, a recess in the base of each of said saddles, a pivot pin adapted to engage both of said recesses, locking means maintaining said pivot pin in engagement with said recesses, and electrically insulating means preventing flow of electric current between said pipe-engaging surfaces of said saddles.

References Cited in the file of this patent

UNITED STATES PATENTS

| | | |
|---|---|---|
| 460,952 | Converse | Oct. 13, 1891 |
| 2,767,003 | Gilmont | Oct. 16, 1956 |

FOREIGN PATENTS

| | | |
|---|---|---|
| 289,609 | Switzerland | July 1, 1953 |